Jan. 9, 1951  B. A. KNAUTH ET AL  2,537,676

THYRATRON SYSTEM

Filed March 1, 1948

INVENTORS
BERTHOLD A. KNAUTH
AND PAO H. CHIN
BY
Semmes, Keegin, Robinson & Semmes
ATTORNEYS Patented Jan. 9, 1951

2,537,676

UNITED STATES PATENT OFFICE 2,537,676

THYRATRON SYSTEM

Berthold A. Knauth, Bolton, N. Y., and Pao Hsiung Chin, Cranford, N. J., assignors, by direct and mesne assignments, to The Motorspeed Corporation, New York, N. Y.

Application March 1, 1948, Serial No. 12,325

6 Claims. (Cl. 318—345)

Our invention relates to controlling the firing angle of thyratron tubes in which it has many applications, such as arc-welding, resistance welding, servo mechanisms, the control of the rate of rotation of electric motors, and other applications which will be apparent from the ensuing description.

While the drawings illustrate the system as applied to the control of the rate of rotation of a direct current motor, it will be apparent that the system has many other applications in industry where similar electrical conditions are desired in operating circuits.

In the particular illustrations which we have shown in the drawings, one of the important objects of the invention is to maintain a constant speed, with automatic compensation for change in the load imposed on the motor. A particular use for this system is to maintain a constant speed in, for instance, a pumping mechanism, where the motor may be subjected to varying loads by reason of the change in viscosity of the liquid which is being pumped.

It is well known that a counter E. M. F. is generated in the armature conductors of a D. C. motor when the armature is rotating so as to "cut" lines of magnetic flux as from a stationary magnetic field, and that when the magnetic field is unvarying the magnitude of this counter E. M. F. is approximately in direct proportion to the speed of the armature. The same phenomenon is in effect in a circuit where the armature is supplied with unidirectional pulses of current from an alternating-potential source through a grid-controlled gaseous-discharge rectifier tube and where the motor field is separately excited from a constant-potential source of direct current. However, in such a circuit the potential applied to the anode-cathode circuit of the rectifier tube is the difference between the potential of the power source and the counter E. M. F. across the terminals of the armature, hence conduction of the rectifier can be started only during that portion of the alternating half-cycle of the alternating-potential power source when the anode of the tube is positive with respect to its cathode. Once conduction of the rectifier is started, and because of the inductance of the armature winding, the rectifier may remain conductive for a period of time after the potential of the alternating-potential source becomes negative. Neglecting the voltage drop across the rectifier tube, during conduction the wave form of the terminal voltage of the armature assumes the same wave form as the applied potential of the armature. After conduction, the terminal voltage approaches in value the generated counter E. M. F., starting from a level of the instantaneous potential of the alternating potential power source at the instant of cessation of conduction and approaching the counter E. M. F. level with a continuously decreasing rate of change of potential. The fact of the armature terminal voltage approaching the counter E. M. F. value slowly, after conduction ceases, is due to characteristics of the electro-magnetic circuit of the motor armature itself.

The circuit of this invention relies, for it self-regulating motor-speed characteristics, on the following as well as other conditions and characteristics: (a) the use of the armature terminal voltage as a measure of speed at a time when no current flows into the armature and when, therefore, this voltage should be the counter E. M. F. potential proportional to true speed, and (b) the inherent modification of this armature terminal voltage, at a time when no current flows into the armature, by the "residual" electromagnetic effect of the current which has just ceased to flow.

An object of this invention is to provide an improved thyratron regulator circuit for direct current motors that is adapted for use particularly with motors requiring relatively small armature currents, say, the fractional H. P. sizes.

Another object of this invention is to provide a thyratron regulator circuit for direct current motors in which the grid phase shifting circuits for the thyratron utilize and inherently smooth out the wave forms of the motor armature and field voltages.

Another object of this invention is to provide an improved regulator circuit having stable operating characteristics for a direct current motor.

Still another object of this invention is to provide a thyratron control circuit for direct current motors to improve the speed-regulation characteristics.

Other objects will be apparent to those skilled in the art to which this invention relates from the following specification, claims and drawing.

Figure 1:
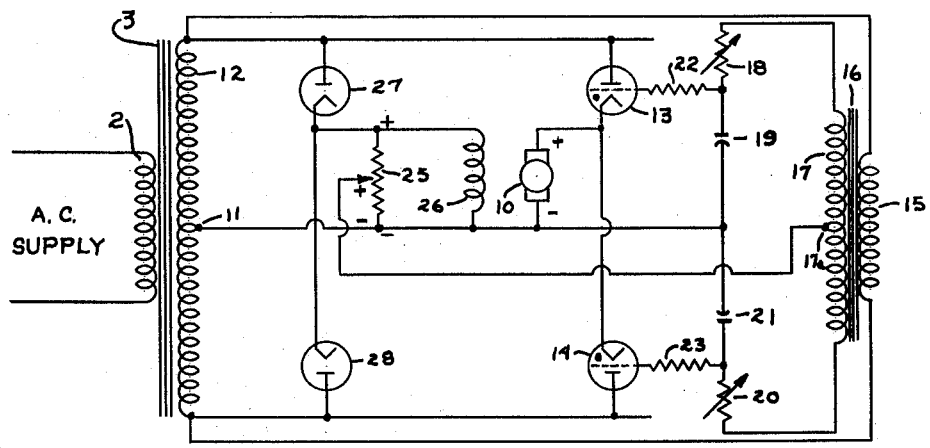
Figure 1 illustrates a schematic wiring diagram of one embodiment of thyratron regulator circuit of this invention.
Figure 2:
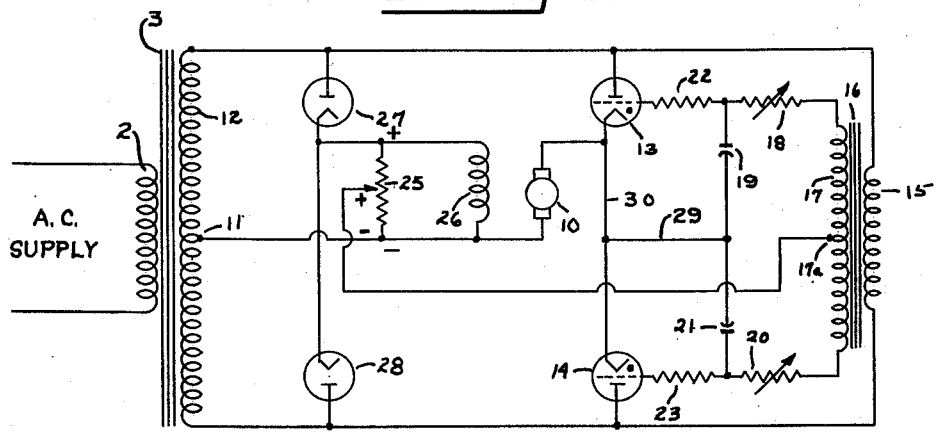
Figure 2 illustrates a schematic wiring diagram of another embodiment of the thyratron regulator circuit of this invention.

In Figures 1 and 2 there are illustrated thyratron circuits for controlling direct current motors. These circuits are provided with power from an A. C. supply having a relatively constant potential. This A. C. supply is connected to the primary 2 of the transformer 3.

In this electronic motor control circuit the armature 10 of the motor is supplied with undirectional current pulses during both the positive and negative portions of the alternating current cycle of the power supply. This is accomplished by connecting one side of the armature 10 of the direct current motor to the center tap 11 of the transformer secondary 12. The other side of the motor armature 10 is connected to the cathode of the thyratrons 13 and 14, these cathodes being connected together. The anodes of the thyratrons 13 and 14 are connected to the opposite ends of the transformer secondary 12 so that these thyratrons function as diametric (full wave) rectifiers inasmuch as they are connected to rectify alternate halves of the alternating current cycle.

The primary 15 of the transformer 16 is connected to the secondary 12 of the transformer 3 although, of course, this primary 15 may be connected across the primary 2 of the transformer 3 and the primary 15 may be dispensed with entirely by providing the transformer 3 with another winding corresponding to the secondary winding 17.

The secondary 17 of the transformer 16 is inductively coupled to the primary 15 and the ends of this secondary are connected to a pair of phase shifting circuits including the resistors 18 and 20 and the capacitors 19 and 21. One terminal of the resistor 18 is connected to one end of the secondary 17, and the other terminal is connected to one side of the capacitor 19 and to one end of the grid current limiting resistor 22. The other end of this resistor 22 is connected to the grid of the thyratron 13. Likewise the resistor 20 is connected between the lower end of the secondary 17 and the capacitor 21 and the grid current limiting resistor 23. The other end of the resistor 23 is connected to the grid of the thyratron 14.

The center tap 17a of the secondary 17 is connected to the variable contact of the potentiometer 25, and the junction between the capacitors 19 and 21 is connected to the center tap 11 of the secondary 12. One side of the winding of the potentiometer 25, and one side of the motor field winding 26, are connected together and to the cathodes of the rectifier tubes 27 and 28. The anodes of these rectifier tubes 27 and 28 are connected to the ends of the secondary winding 12, that is, the anode of the rectifier tube 27 is connected to one end of the secondary 12 and the anode of the rectifier 28 is connected to the other end of the secondary 12.

In Figure 2 of the drawing a modified form of this invention is illustrated and in this figure the parts corresponding to the parts of Figure 1 are designated by the same reference numerals. The embodiment of this invention shown in Figure 2 is the same as that shown in Figure 1 except that the junction between the capacitors 19 and 21 is connected by the wire 29 to the wire 30 joining the cathodes of the thyratrons 13 and 14 instead of to the lower end of the armature 10 of the direct current motor.

Figure 3:
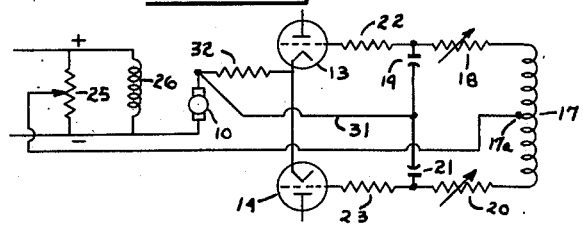
Figure 3 illustrates a modified form of the circuit shown in Figure 2 in which a resistor is connected in series with the motor armature and the cathodes of the thyratrons to improve the speed-regulation characteristics of the circuit.

A further modified form of this circuit is shown in Figure 3 in which the junction between the capacitors 19 and 21 is connected to the upper brush of the armature 10 of the direct current motor by the conductor 31 and through the resistor 32 to the cathodes of the thyratrons 13 and 14. The complete wiring diagram is not shown in Figure 3 inasmuch as this diagram is the same as Figures 1 and 2 except as described above.

The thyratrons 13 and 14 function as grid controlled gaseous rectifiers for rectifying the output of the transformer secondary 12 and for this purpose the anodes of these thyratrons 13 and 14 are connected to the respective ends of the secondary 12. The cathodes of the thyratrons are connected together and to the upper brush of the motor armature 10. The lower brush of this motor armature is connected to the center tap 11 of the secondary 12 so that when the thyratrons 13 and 14 are firing the motor armature 10 receives direct current pulses from the upper and lower halves of the secondary 12 during alternate half cycles.

The field current for the motor field 26 is also derived from the secondary 12 through the diode rectifiers 27 and 28, the anodes of which are connected to the respective ends of the secondary 12 and the cathodes of which are connected together to the upper terminal of the field 26. The lower terminal of this field is also connected to the center tap 11 of the secondary 12. The rectifiers 27 and 28 also supply a direct current voltage across the potentiometer 25 that is used for controlling the firing of the thyratrons 13 and 14 so that the current through the armature 10 may be controlled. As a result the speed of the motor may be manually controlled by manipulating the variable contactor of the potentiometer 25.

These circuits allow both armature and field of the D. C. shunt motor to be supplied from the same mid-tapped winding of the A. C. supply. In these instances, the mid-tap of the transformer winding becomes the negative D. C. terminal common to both armature and field.

To avoid using auxiliary sources of D. C. for grid control of the thyratron tubes supplying the armature, it is desired to use the relatively constant voltage of the field winding by connecting a potentiometer, 25, across this winding and utilizing the voltage from slider to negative-end 11 as the adjustment by which to pre-set the level of armature voltage.

In the embodiment of this invention shown in Figure 1 the direct current voltage derived from the potentiometer 25 is in effect applied between the center tap 17a of the secondary 17 and the junction between the capacitors 19 and 21 while the armature 10 of the motor is connected between the junction of the capacitors 19 and 21 and the cathodes of the thyratrons 13 and 14. The center tap of the secondary 12 is connected to the junction of the capacitors 19 and 21. In this way the counter E. M. F. of the armature 10 is applied between the cathodes of the thyratrons 13 and 14 and the capacitors 19 and 21 so that it can function as part of the grid bias of the thyratrons.

In Figure 1, the direct potential of potentiometer 25, adjustable in magnitude by setting of the potentiometer slider, is introduced into the grid-cathode circuit of the thyratrons by being caused to appear as a D. C. component across capacitors 19 and 21. This is accomplished by virtue of the fact that the two halves of the mid-tapped winding 17 of auxiliary transformer 16 constitute two arms of a bridge circuit of which the other two arms are those including resistor 18 in series with capacitor 19 and capacitor 21 in series with resistor 20. This being a balanced bridge circuit, there is zero alternating potential between the points 17a on the transformer winding and point 11, the junction of the two capacitors 19 and 21. So, if a direct potential is impressed across these points, this potential will appear across each capacitor 19 and 21 and in such polarity that if the applied potential is positive (+) on point 17a relative to point 11, the capacitor terminals connected to point 11 will each be negative and the other terminals, connected to the resistors, will be positive. And, vice versa. In addition to this D. C. component which is caused to appear across each capacitance, there will be a quadrature lagging A. C. component, of relatively small magnitude, caused by the alternating potential of winding 17 being impressed in the series R. C. circuit comprising resistor 18, capacitance 19, capacitance 21 and resistor 20. The net result of the A. C. plus D. C. components across the capacitances is to produce a grid phase control action as the D. C. component is caused to be varied in magnitude.

In Figure 1 the complete grid-to-cathode circuit of each thyratron consists of the armature terminal voltage, in a degenerative or regulating sense of polarity, in series opposition to the voltage across the phase control capacitance 19 or 21, which voltage is therefore of a tune-on sense of polarity, and in series with the current limiting grid resistance 22 or 23. Thus, the D. C. component across the capacitances 19 and 21 pre-determine the armature voltage level at which the circuit tends to regulate or tends to maintain the armature voltage approximately equal to the D. C. component. Of course, at the time the armature terminal voltage is being compared with the voltage across capacitance 19 or 21 to determine the firing point of the thyratrons, there is no current flowing into or out of the armature and hence the terminal voltage is only C. E. M. F. proportional speed and modified as a function of armature current by the inherent characteristics of its induction electromagnetic circuit as has been explained.

In the circuit shown in Figure 2 the counter E. M. F. of the armature 10 of the motor can also function as part of the grid bias of the thyratrons since the armature 10 is connected in series with the lower portion of the potentiometer 25 between the center tap 17a of the secondary 17 and the junction of the capacitors 19 and 31. The junction of the capacitors 19 and 21 is connected by the conductor 29 to the cathodes of the thyratrons 13 and 14 so that the voltages across the capacitors 19 and 21 of the phase shifting circuits are applied between the cathodes and grids of the thyratrons 13 and 14, respectively.

Figure 2 differs from Figure 1 in that the direct potential impressed between points 17a and 29 (29 being the junction of the two capacitances 19 and 20) is the difference between the armature terminal voltage and the pre-set reference voltage of the potentiometer 25. This difference in voltage is caused to appear across capacitances 19 and 21, in a manner previously explained, and in addition to the quadrature lagging A. C. component as previously mentioned. Thus, the difference between armature terminal voltage and pre-set reference voltage becomes the only D. C. component on capacitances 19 and 21. Now, the grid-to-cathode circuit of each thyratron merely becomes the capacitance voltage of 19 or 21 in series with current limiting resistances 22 or 23. The regulating action by which the armature voltage, in a degeneration or turn-off or regulating sense-of-potential, is compared with a reference potential, which has a turn-on sense-of-potential, is done outside of the grid-to-cathode circuit of the thyratron and the result of this comparison, the difference or error between the actual voltage and the reference voltage, is introduced into the thyratron grid circuits via capacitances 19 and 21 instead of this difference being compared within the grid-cathode circuits as in Figure 1. The regulating action of this circuit will differ from that of Figure 1 in that there is a tendency for the armature voltage to be compared with the reference voltage during the whole of the A. C. cycle instead of just during the periods of non-conduction and thus the signal of speed is not only C. E. M. F. with its inherent regenerative modification due to inductive electromagnetic carry-over as a function of the amount of the armature current but also includes the IR drop of the armature in a degenerative sense.

By connecting the armature 10 and the potentiometer 25 between the capacitors 19 and 21 and the center tap 17a of the secondary 17, the capacitors 19 and 21 and the resistors 18 and 20 function as a filter for smoothing out the wave forms of the voltages derived from the motor armature and field terminals.

The circuit shown in Figure 3 employing the resistor 32 between the cathodes of the thyratrons 13 and 14 and the armature 10 improves the speed-regulations characteristics of the circuits shown in Figures 1 and 2. In this case the voltage across the portion of the potentiometer 25 between the variable contactor thereof and the lower terminal of the potentiometer winding is applied in series with the counter E. M. F. of the armature 10 between the center tap 17a of the transformer 17 and the junction of the capacitors 19 and 21. The upper brush of the armature 10 and the resistor 32 are connected by the conductor 31 to the junction of the capacitors 19 and 21 so that the voltage drop across this resistor 32 also forms part of the grid bias of the thyratrons 13 and 14. This voltage drop is proportional to the direct current flowing through the armature 10 and tends to make the conductor 31 negative with respect to the thyratron cathodes.

The circuit of Figure 2 is modified in Figure 3, which includes a degenerative IR drop of resistance 32 in the grid-to-cathode circuits of the thyratrons in addition to the voltage across capacitance 19 or 21 as in Figure 2. This degenerative-sense voltage drop proportional to armature current across resistance 32 serves to additionally compensate for any excessive regenerative effect associated with this same armature current as evidenced by the inductive electro-magnetic effect inherent in the armature circuit. In this sense, the use of resistance 32 performs much the same function as the R. C. circuit across the armature wherein the tailored voltage across C was used instead of the whole armature voltage to compensate for this excessive turn-on effect proportional to armature current.

In all these circuits, Figures 1, 2, 3, the adjustment of resistances 18 and 20 serves as a means of varying the magnitude of the A. C. quadrature component across the capacitances 19 and 21 and serves as an additional means of balancing the two circuits so as to fire the thyratrons alike during their respective half-cycles of the supply voltage.

While we have shown our system as applied in the control of a direct current motor it will be obvious that the system is useful in many other connections and that the immediate application has been illustrated and described merely to illustrate the invention. We desire that our invention be limited only by the scope of the appended claims and the showing of the prior art.

We claim:

1. A thyratron control system for direct current motors comprising a pair of thyratrons each having an anode, a grid and a cathode, a direct current motor having a field winding and an armature, one side of said armature being connected to said thyratron cathodes, a phase shifting circuit connected to the grid of each of said thyratrons, a transformer having connections for connecting the center tap of the secondary thereof to the other side of said motor armature, connections for connecting the ends of said secondary to said thyratron anodes, a source of direct current for said motor field winding and a means for applying at least a part of the voltage across said field winding in series with the thyratron grid phase shifting circuits.

2. A thyratron control system for controlling a direct current motor comprising a thyratron having an anode, a grid and a cathode, a direct current motor having an armature connected in series with said thyratron across an alternating current supply, a phase shifting circuit connected to said thyratron grid, a transformer connected to said alternating current supply and to said phase shifting circuit, a rectifier connected to said alternating current supply for supplying direct current to the field of said motor, a potentiometer connected across said motor field winding, and connections for connecting the variable contactor of said potentiometer to the secondary of said transformer for controlling the grid bias potential of said thyratron to apply at least a part of the voltage across said field winding in series with said thyratron grid phase shifting circuit.

3. A thyratron control system for controlling a direct current motor comprising a thyratron having an anode, a grid and a cathode, a direct current motor having a field winding and armature, said armature being connected in series with said thyratron across an alternating current supply, a phase shifting circuit connected to said thyratron grid, a transformer connected to said alternating current supply for supplying potential to said phase shifting circuit, a rectifier connected to said alternating current supply for supplying direct current to the field of said motor, a resistor connection in series with said motor armature, and connections for connecting the junction of said resistor and said armature to said phase shifting circuit to control speed-regulation characteristic of the motor.

4. A thyratron control system for direct current motors comprising a pair of thyratrons each having an anode, a grid and a cathode, said thyratrons having the cathodes connected together, a transformer having a center tapped secondary, the ends of said secondary being connected to the anodes of said thyratrons, a motor having an armature connected between the cathodes of said thyratrons and the center tap of said secondary, phase shifting circuits connected to the grids of said thyratrons, a field winding for said motor, a source of direct current for said field winding, a potentiometer connected across said field winding, one end of said field winding being connected to said center tap of said secondary and to one end of the armature of said motor and to said phase shifting circuit, a source of alternating current potential connected to said phase shifting circuits and means for connecting the variable contactor of said potentiometer to said source of alternating current potential.

5. A thyratron control system for controlling a direct current motor comprising a pair of thyratrons each having an anode, a grid and a cathode, a direct current motor having a field winding and armature, said armature being connected in series with said thyratrons across an alternating current supply, a phase shifting circuit connected to said thyratron grids, a transformer connected to said alternating current supply for supplying potential to said phase shifting circuit, a rectifier connected to said alternating current supply for supplying direct current to the field of said motor, a resistor connection in series with said motor armature, and connections for connecting the junction of said resistor and said armature to said phase shifting circuit to control speed-regulation characteristic of the motor.

6. A thyratron control system for controlling a direct current motor comprising a pair of thyratrons each having an anode, a grid, and a cathode, a direct current motor having an armature with its positive terminal connected to the cathodes of the thyratrons, a first transformer with a secondary having each end connected to an anode of the thyratrons a second transformer, the primary of the second transformer being connected across the secondary of the first transformer, a phase shifting circuit connected to the ends of the secondary of the second transformer, said phase shifting circuit being connected to the grids of the thyratrons, a rectifier connected to an end of the secondary of the first transformer to supply direct current to the field of the motor, a center tap on the secondary of the first transformer connected to the negative terminals of the field and the armature of the motor, a potentiometer connected across the field of the motor, and means connecting the variable contactor of the potentiometer with a center tap on the secondary of the second transformer for controlling the grid bias of the thyratrons.

BERTHOLD A. KNAUTH.
PAO HSIUNG CHIN.

REFERENCES CITED

The following references are of record in the file of this patent:

UNITED STATES PATENTS

| Number | Name | Date |
| --- | --- | --- |
| 1,847,934 | Elder et al. | Mar. 1, 1932 |
| 2,082,496 | Howe | June 1, 1937 |
| 2,376,169 | Moyer | May 15, 1945 |